United States Patent [19]
Miller, III et al.

[11] Patent Number: 5,782,423
[45] Date of Patent: Jul. 21, 1998

[54] SPIRAL TUBE COMPACT PRETENSIONER AND RETRACTOR

[75] Inventors: Harold John Miller, III, Troy; Niels Dybro, Utica, both of Mich.; Harjeet Gill, Windsor, Canada; Jason W. Raines, Harrison Township, Mich.

[73] Assignee: AlliedSignal Inc., Morristown, N.J.

[21] Appl. No.: 820,857

[22] Filed: Mar. 20, 1997

Related U.S. Application Data

[63] Continuation-in-part of Ser. No. 542,080, Oct. 12, 1995, abandoned.

[51] Int. Cl.⁶ .................................................. B60R 22/46
[52] U.S. Cl. ............................................................ 242/374
[58] Field of Search ........................ 242/374; 280/806, 280/807

[56] References Cited

U.S. PATENT DOCUMENTS

| | | |
|---|---|---|
| 4,014,479 | 3/1977 | Nilsson et al. ........................ 242/374 |
| 4,444,010 | 4/1984 | Bendler ................................. 242/374 |
| 5,505,399 | 4/1996 | Schmid et al. ........................ 242/374 |

FOREIGN PATENT DOCUMENTS

| | | |
|---|---|---|
| 0581288 | 2/1994 | European Pat. Off. . |
| 2 430 241 | 2/1980 | France ................................. 242/374 |
| 2505626 | 8/1976 | Germany . |
| 32 20 498 A1 | 12/1983 | Germany ............................. 242/374 |
| 9308273 | 7/1993 | Germany . |
| 9405834 | 9/1994 | Germany . |
| 60-240549 | 11/1985 | Japan . |
| 2 223 666 | 4/1990 | United Kingdom .................. 280/806 |

*Primary Examiner*—John P. Darling
*Attorney, Agent, or Firm*—Markell Seitzman

[57] ABSTRACT

An apparatus (20, 500) comprising: first driven gear (502) operatively linked to a spool of a retractor (20) to rotate the spool (24) in a direction of retraction to cause a seat belt (31) wound thereabout to retract; a helically shaped first driving member (530) having a front end (536) initially maintained out of engagement with the driven gear and pushed into engagement with the first driving member to cause same to rotate; second driving member (520) operatively linked to a rear end of the first driving member for pushing the first driving member into engagement with the driven gear thereby causing the driven gear to rotate.

10 Claims, 3 Drawing Sheets

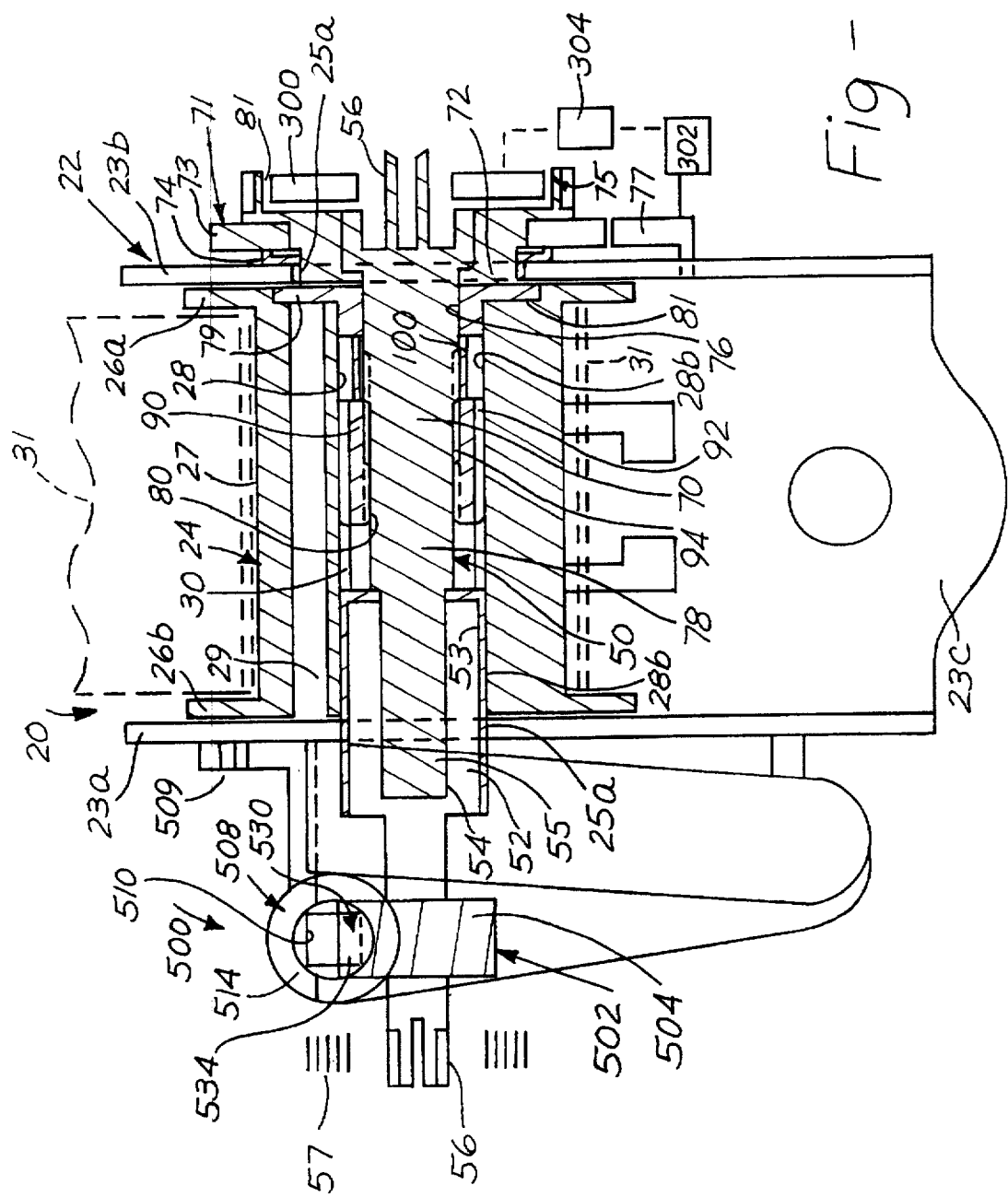

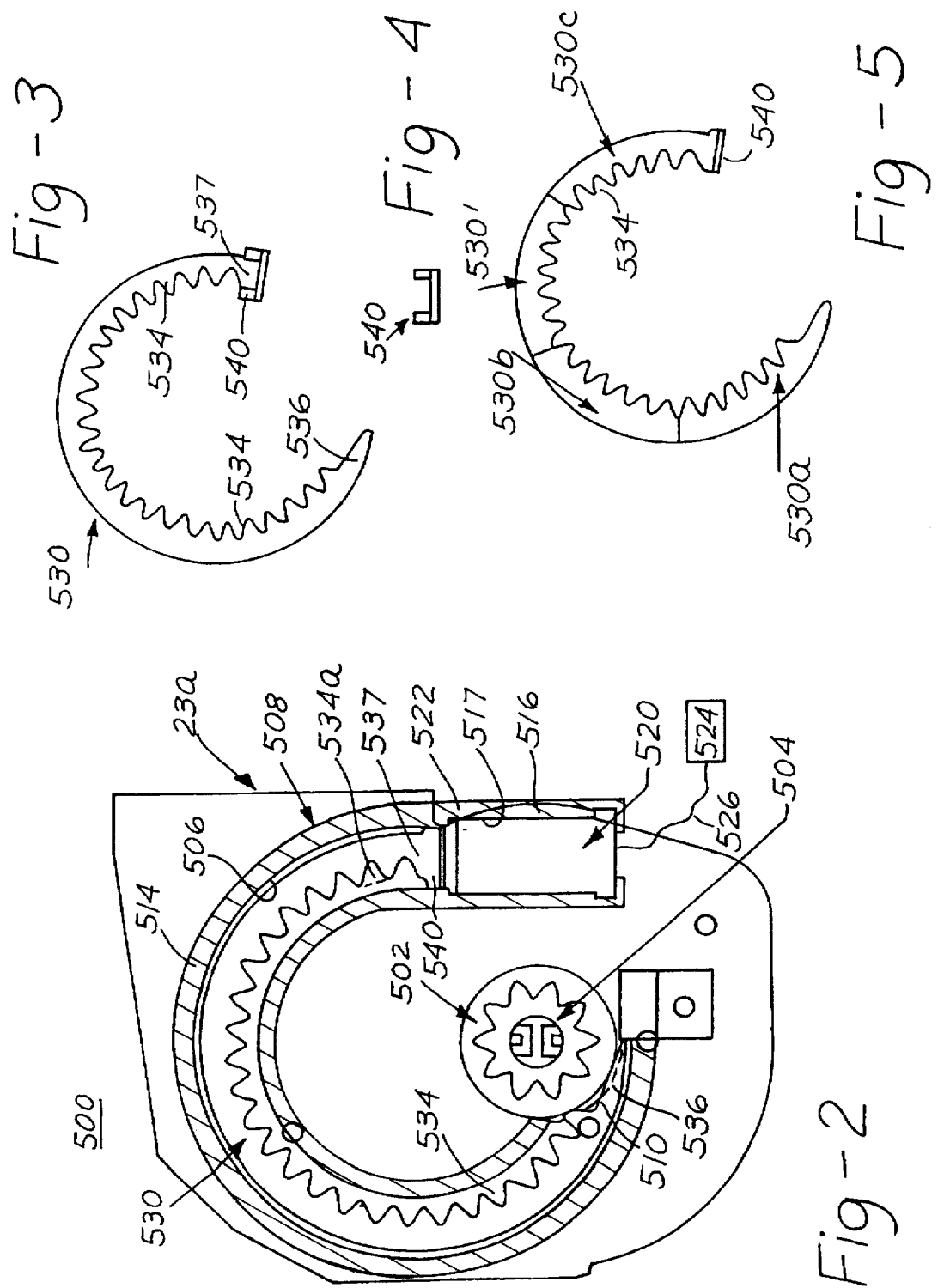

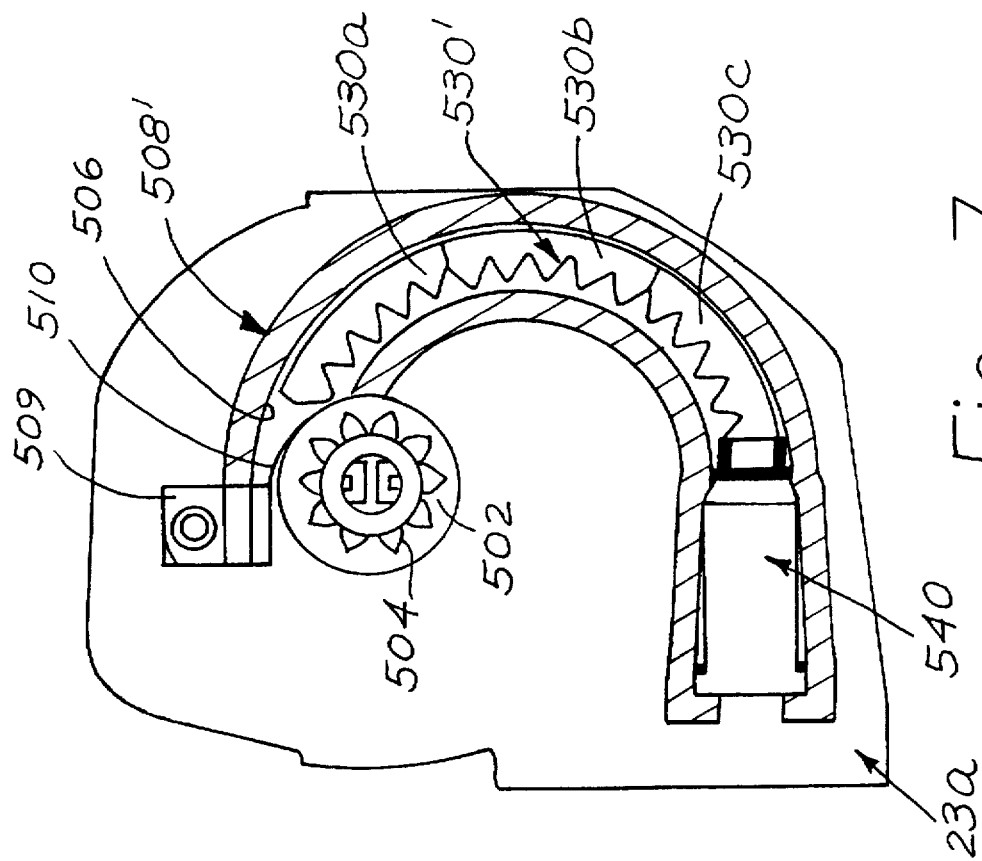
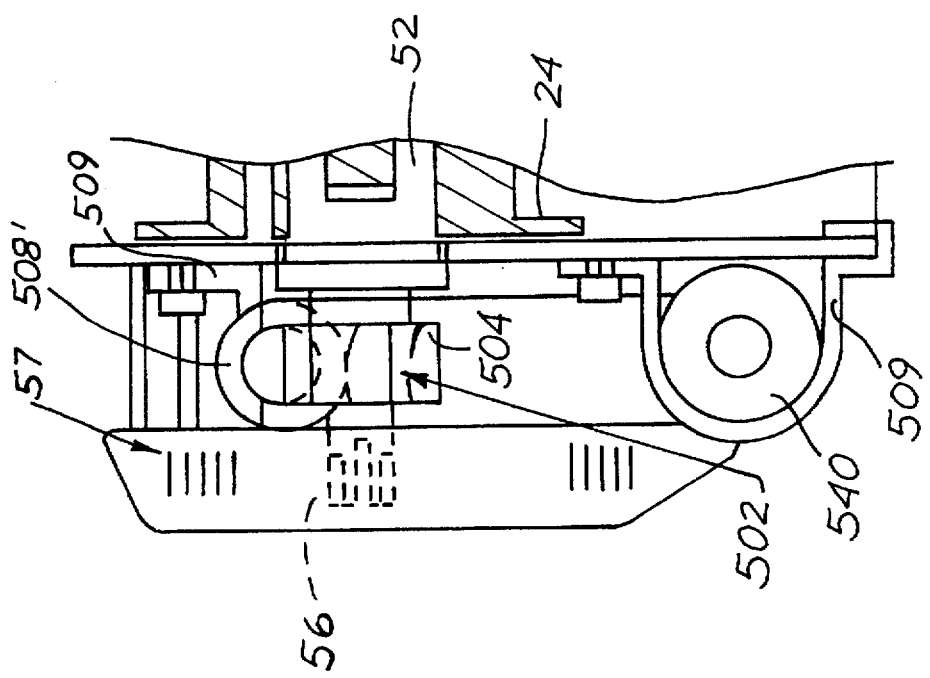

SPIRAL TUBE COMPACT PRETENSIONER AND RETRACTOR

This application is a continuation-in-part of application Ser. No. 08/542,080 filed Oct. 12, 1995, now abandoned.

BACKGROUND AND SUMMARY OF THE INVENTION

The present invention generally relates to a safety restraint device for protecting vehicle occupants and more particularly a pretensioning device typically usable to tension a seat belt wound about a seat belt retractor or attached to that portion of the seat belt connected to a buckle.

Pretensioners or belt tighteners, as they are also called, are currently used in industry to operate in conjunction with seat belt retractors or are attached to one end of the belt that is connected to a seat belt buckle. A typical pretensioner for a seat belt retractor or buckle comprises a movable piston joined to a cable. The piston typically moves down a straight tube. The use of the straight tube creates packaging problems within the vehicle as it is difficult to orient the tube within the room that is made available. Retractor pretensioners also use clutches to decouple the pretensioner from the retractor so that the pretensioner does not interfere with the normal operation of the retractor. These clutches are bulky and further increase the package size of the restraint device. The clutches are often intricate devices which complicate the operation of the pretensioner and add to its cost.

It is an object of the present invention to provide a simple, compact and reliable pretensioner that can be used with a seat belt retractor and a seat belt buckle.

In the preferred embodiment the present invention comprises a first driven means operatively linked to a spool of a retractor to selectively rotate the spool in a direction of retraction to cause a seat belt wound thereabout to retract; a spiral shaped first drive means having a front end initially maintained out of engagement with the first driven means and pushed into engagement with the first driven means to cause same to rotate; a second drive means operatively linked to a rear end of the first drive means for pushing the second drive means into engagement with the first driven means. In the preferred embodiment of the invention the first driven means comprises a toothed gear, the first driven means comprises a helical shaped gear received within a helical shaped, preferably tubular, housing and the second driven means comprises a pyrotechnic detonator, initiator or squib. The toothed gear is connected to the retractor spool to reverse rotate the spool during an emergency. The retractor includes various sensors to initiate the locking up of the retractor to prevent protraction of the seat belt. The preferred embodiment of the invention uses a constant force retractor, that is, one that creates a controlled, limited force on the seat belt during emergency operation. The pretensioner of the present invention can be used with virtually any retractor. In another embodiment of the invention a semi-circular segment tube and driving gear is used. The driving gear can be rigid or flexible, metal or plastic.

Many other objects and purposes of the invention will be clear from the following detailed description of the drawings.

BRIEF DESCRIPTION OF THE DRAWINGS

In the drawings:

FIG. 1 illustrates a cross-sectional view illustrating the major components of the present invention.

FIG. 2 is a cross-sectional view through section lines 2—2 of FIG. 1.

FIG. 3 is an isolated view of a helical gear.

FIG. 4 is an isolated view of a seal.

FIG. 5 shows an alternate embodiment of the invention.

FIGS. 6 and 7 show another embodiment of the invention.

DETAILED DESCRIPTION OF THE DRAWINGS

Reference is made to FIGS. 1–4 which illustrate a constant force retractor 20 operating in concert with a pretensioner 500. In the preferred embodiment of the invention the retractor is an energy absorbing retractor capable of generating a fairly constant reaction force on the webbing after the pretensioner has been activated and the seat belt has been loaded by the occupant. It should be appreciated that the pretensioner 500 can operate with virtually any retractor. This is also true of the retractor, that is, it can be used with virtually any pretensioner. The retractor 20 comprises a U-shaped frame 22 adapted to be connected to a part of a vehicle body or to a part of an occupant seat. The frame includes frame sides 23a,b having respective openings 25a and 25b and a rear or connecting part 23c typically having an opening for receipt of a fastening bolt. The central openings may be of different diameters as shown or the same which will depend upon how the spool is supported on the frame sides. The retractor additionally includes a spool or reel 24 rotatably mounted to the frame 22. The spool includes two (2) flanges 26a and 26b, a center part 27 about which seat belt webbing 31 is wound and a center bore 28 which includes a plurality of axially directed splines, slots or key ways 30. The center part 27 includes a slot 29 which provides a means for inserting one end of the seat belt 31 into the spool in a known manner.

Partially situated within the bore 28, is an axle assembly 50 which includes a first member 52 inserted in bore end 28a, and a second member 70. The first member 52 includes a walled portion 53 and provides a bushing surface to rotatably support the spool. The first member 52 also includes a hexagonal bore 54 to provide a driving, rotational engagement with a complementary shaped end 55 of the second member 70 of the axle assembly. The first member 52 includes a forked end 56 that forms a spring arbor and is adapted to receive a rewind spring 57, of known construction to retract the extended seat belt. Integrally formed on the first member 52 is a gear 502 which is part of the pretensioner 500.

The second member 70 includes a first part 72 that is supported relative to the frame 22 by a bearing 74. The second member 70 additionally includes a second part 76 fitted against an annular member 79 which serves as a mechanical stop. The member 79 is received within an annular groove 81 of the spool and also provides a bearing surface about which the spool rotates. The second member 70 includes a narrow portion 78 that extends further into the center of the bore 28. This narrow portion 78 includes a plurality of threads 80 and terminates in the hexagonally shaped end 55 which is driven by the first member 52. A carrier member such as a threaded nut 90 interposes the narrow member 78 and the spool 24. As can also be seen from FIG. 1 the inside surface of the nut includes threads 94 which matingly engage threads 80 of the narrow portion 78. This nut, on its outer surface, includes a plurality of splines 92 which permit the nut to move axially along the cooperating splines 30 of the spool 24 as it rotates on the threads 80. As can be appreciated the threads can be on the spool and the splines on the narrow portion 78. The second member 70 also includes a lock wheel 71 that may be integrally formed or separate having lock teeth 73 thereon engaged by a locking pawl 77 rotatably mounted to the frame 22 in a known manner. A deformable bushing 100 is between the nut 90 and stop 79.

The retractor additionally includes a web sensor 300 and a vehicle sensor 302. Member 70, that is the lock wheel 71, is locked in response to information derived from the vehicle sensor and a web sensor. These sensors respectively sense excessive vehicle deceleration and an excessive rate increase of seat belt protraction from the retractor 20. One such vehicle sensor 302 and web sensor 300 are diagrammatically shown in FIG. 1. In reality the web sensor may be nestled within a lock cup 304 which is received adjacent a ratchet wheel 75. The vehicle sensor is carried by the lock cup and includes a sensor pawl that engages ratchet teeth 81. Movement of the lock cup moves the lock pawl 77 into engagement with the lock teeth 73. European Patent Document EP 0 228 729 A1 is illustrative of a retractor having a web sensor, vehicle sensor, and lock cup to move the lock pawl 77 into engagement with the a lock wheel. This document is incorporated herein by reference.

The pretensioner 500 includes the driven gear 502, having teeth 504, linked to axle part 52 and a tubular housing 508 having a spiral or helically shaped passage 506 As can be seen from FIG. 1 the cross-section of the passage is generally circular shaped having a guide wall 514. The housing 508 is attached to the frame 22 (see FIG. 1) with the spring arbor extending therethrough. The tube 508 includes a first open end 510. The teeth 504 of gear 502 extend into the open end 510 (or a slot in the wall 514 at the open end) and into the passage 506. The rear end 516 of the tube includes a stepped bore 517 to receive a detonator, squib, or initiator 520. The detonator, initiator or squib 520 is known in the art and produces products of combustion within a combustion chamber 522 upon receipt of an electric control signal generated by an electronic control unit 524 and communicated to the squib via wires 526. The control or activation signal is generated upon sensing that the vehicle is involved in an accident of sufficient magnitude to warrant added occupant protection.

Situated within the tube 508 is a driving mechanism generally shown as 530. In the preferred embodiment the cross-section of gear 530 is generally square shaped and circumscribed by the walls of tube 508. The gear 502 may be a pinion gear having angled shaped teeth to engage the angled teeth of the helical gear 530. Alternatively, a spur gear with sufficient clearance can be used to engage the angled teeth 534 of the gear 530. The tube is secured to the retractor frame such as by welding or other means. One such means includes attachment bracket 509. In the illustrated embodiment this driving mechanism constitutes a rigid, toothed spiral gear having a plurality of teeth 534. The gear 530 can be made of a flexible or rigid plastic received in the tube. If the gear is plastic its shape can be straight (and flexible) or formed as a flexible or rigid helix and inserted into the tube 508. As can be seen from FIG. 2, the end 536 of the gear 530 is initially maintained apart from the drive gear 502 so as not to impede the normal retraction and protraction motion of the spool. If a metal gear 530 is used its end 536 can be formed in plastic to provide for a compliant engagement of the driving gear and the driven gear 502 to reduce the possibility of the two gears binding. The other end 537 of the gear 530 is attached to a self-sealing plastic slug, cap, or piston 540 which is initially positioned adjacent the chamber 522 and forms one end of the chamber 522.

The operation of the pretensioner 500 is as follows. Upon sensing an emergency condition the detonator 520 is activated to produce products of combustion which bear against a facing wall of the slug or piston 540. The piston also provides a seal which prevents the products of combustion from escaping from the chamber 522. Thereafter the gear 530 is propelled down the passage 506 by the products of combustion. As the teeth of the driving gear 530 engage the teeth of gear 502 the gear 502 rotates to reverse rotate the spool and to retract a determinable amount of webbing back onto the spool thereby drawing the seat belt 31 tightly about the occupant. As shown, under the operation of the pretensioner 500, the spool 24 will reverse rotate about 2.5 revolutions upon deployment of the gear 530. In one embodiment of the invention the helical gear 530 advances only partially through the passage 506, that is, its end 536 is pushed through the open end 510 but its rear end 537 remains within the tube 506. It might be desirable to eliminate one of the teeth of the gear 530, such as tooth 534a near end 537, to insure that the gear 530 becomes bound in the tube. The eliminated tooth 534a, or rather the resulting profile of the gear 530, is shown by phantom line.

Reference is briefly made to FIG. 5 which illustrates an alternate embodiment of the present invention. This alternate embodiment still uses a helically shaped, though segmented gear 530' having three gear segments 530a, 530b and 530c, each having a number of teeth 534. In this embodiment as each segment of the gear 530' moves through the open end 510 of the tube it falls from the tube.

As mentioned above, the pretensioner 500 can work with virtually all retractors and can be configured to direct drive the spool, that is, by having the driven gear 502 in direct driving communication with the spool, or alternatively indirectly drive the spool as indicated in FIG. 1. To have the pretensioner direct drive the spool the bearing surface 53 of axle part 52 is removed and replaced with a splined interconnection with the bore 28 of the spool. One advantage of this approach is that the motion of the spool 24, during its energy absorbing mode, can be used to reverse or back drive the gear 502 and the hence move the gear 530 back into the tube.

FIG. 1 shows the combination of the pretensioner 500 with an energy absorbing retractor 20; the following defines the overall operation of this combination.

During an accident the lock wheel is stopped by the action of the various sensors and the pretensioner 500 is activated to reverse wind the spool. The rotation of the first member 52 is transferred to the second member 70 through the interface of the bore 54 and end 55. The rotation of the second member 70 is transferred to the spool 24 through the threaded and splined interconnection of the second member/ nut/spool to eliminate slack in the seat belt (shoulder and/or lap belt). As can be appreciated, with the pawl 77 engaging the teeth 73 of the lock wheel 71 the second member 70 cannot rotate in a belt unwinding direction. Subsequently, the occupant will tend to move forward as the accident progresses and load the seat belt 31. The occupant's motion (position and acceleration) is then controlled by the reaction force generated within the retractor. The occupant's load on the shoulder belt is partially transmitted via the remaining seat belt webbing wound about the center part 27 of the spool 24 creating a torque tending to rotate the spool, in a belt unwinding direction. The spool rotates about the bearing surfaces provided by the first member 52 and the member 79. The tendency of the spool to rotate is curtailed by the reaction forces generated at the interfaces between the nut 90 and the spool 24, the nut and the second member and the lock wheel 71 and the lock pawl 77. The loads (or torques) imparted to the spool are transmitted directly to the threads 80 of the now locked second member 70 which tends to cause the nut 90 to try to rotate to the right about the threads 80 as viewed in FIG. 1 and simultaneously slide along the splines 30. This motion is initially halted by the bushing 100 which is loaded between the stop member 79 and washer 102. At some level of belt force the torsional forces developed at the thread 80/94 interface will be sufficient to cause the bushing 100 to begin to deform. Once this force level is reached the nut 90 will continue to rotate and slide along compressing or deforming the bushing. As can be appreciated as the spool rotates, seat belt webbing is permitted to protract in response to the pulling force exerted by the occupant on the seat belt. The pulling force is limited principally by the reaction force capability of the shaft assembly 50, that is, the compression characteristics of the bushing 100. In this manner the HIC and chest loading of the occupant are limited. As can be seen from the above and in the preferred embodiment of the invention, control of the occupant's motion is obtained by generating a substantially constant reaction force as a function of the displacement, of nut 90 against the belt. This constant reaction force permits the occupant to be subjected to a controlled, generally constant acceleration. Subsequent to the accident, the retractor is fully functional, that is, the spool and seat belt 31 can be retracted, protracted and locked.

FIG. 6 shows a variant of the invention. In this embodiment the tube 508' lies in a plane, rather than being spiral shaped as shown above. The tube 508' is formed an a semi-circular arc. In this embodiment the length of the gear 530 will be shorter than the gear used with a helical tube 508. FIG. 7 shows a cross-sectional view of the tube 508' and gear 530.

Many changes and modifications in the above described embodiment of the invention can, of course, be carried out without departing from the scope thereof. Accordingly, that scope is intended to be limited only by the scope of the appended claims.

We claim:
1. An apparatus (20, 500) comprising:
   first driven means (502) operatively linked to a spool of a retractor (20) to rotate the spool (24) in a direction of retraction to cause a seat belt (31) wound thereabout to retract;
   an inteargally formed, spiral shaped first drive means (530) having a front end (436) initially maintained out of engagement with the first driven means and pushed into engagement with the first driven means to cause same to rotate;
   second drive means (520) operatively linked to a rear end of the first drive means for pushing the first drive means into engagement with the first driven means thereby causing the first driven means to rotate.

2. The apparatus as defined in claim 1 wherein the retractor includes a frame to support the spool and wherein the apparatus includes a drive housing (508) for defining a drive passage (506) through which the first drive means slides, wherein the drive passage does not generally extend outside of the side profile dimensions of the frame.

3. An apparatus (20, 500) comprising:
   first driven means (502) operatively linked to a spool of a retractor (20) to rotate the spool (24) in a direction of retraction to cause a seat belt (31) wound thereabout to retract;
   an arcuately shaped first drive means (530) having a front end (436) initially maintained out of engagement with the first driven means and pushed into engagement with the first driven means to cause same to rotate;
   second drive means (520) operatively linked to a rear end of the first drive means for pushing the first drive means into engagement with the first driven means thereby causing the first driven means to rotate;
   wherein the first drive means comprises one of a segmented semi-circular and helically shaped gear (532) having a plurality of teeth (532) and wherein the first driven means (502) comprises a gear wheel having a plurality of teeth (504) which are engaged by and driven by the first drive means.

4. The apparatus as defined in claim 3 including a drive housing (508) for defining a drive passage (506) through which the first drive means slides.

5. The apparatus as defined in claim 3 wherein each helical gear (502) is segmented.

6. The apparatus as defined in claim 3 further including a retractor frame (22) for rotationally supporting the spool (24) and a return spring (57) for retracting the seat belt;
   at least one sensor (300, 302) for initating the locking-up of the spool.

7. The apparatus as defined in claim 3 wherein the second drive means (520) comprises a pyrotechnic device which generates products of combustion to propel the first drive means down a drive passage.

8. The apparatus as defined in claim 3 wherein a piston (540) is operatively linked to the rear end (536) of the first drive means, and
   a seal (442) is provided to prevent the products of combustion from flowing beyond the helical gear (530) into the drive passage.

9. The apparatus as defined in claim 3 wherein each semi-circular and helically shaped gear is rigid.

10. The apparatus as defined in claim 3 wherein the retractor includes a frame supporting the spool and wherein the apparatus includes a drive housing (508) for defining a drive passage (506) through which the first drive means slides, wherein the drive passage does not generally extend outside of the side profile dimensions of the frame.

* * * * *